United States Patent
Huelga

(10) Patent No.: US 11,076,033 B1
(45) Date of Patent: Jul. 27, 2021

(54) SMART DEVICE SUPPORT

(71) Applicant: Ricardo Huelga, Portland, OR (US)

(72) Inventor: Ricardo Huelga, Portland, OR (US)

( * ) Notice: Subject to any disclaimer, the term of this patent is extended or adjusted under 35 U.S.C. 154(b) by 0 days.

(21) Appl. No.: 16/948,699

(22) Filed: Sep. 29, 2020

(51) Int. Cl.
*H04M 1/04* (2006.01)
*H04B 1/3877* (2015.01)

(52) U.S. Cl.
CPC ............ *H04M 1/04* (2013.01); *H04B 1/3877* (2013.01)

(58) Field of Classification Search
CPC ............................... H04B 1/3888; H04M 1/04
See application file for complete search history.

(56) References Cited

U.S. PATENT DOCUMENTS

| | | | |
|---|---|---|---|
| 1,818,507 A * | 8/1931 | Rose ................. | A24F 27/20 206/100 |
| 2,513,135 A * | 6/1950 | Barber ............... | A45C 11/324 206/37.8 |
| 6,155,469 A | 12/2000 | Johnson et al. | |
| 6,932,309 B1 | 8/2005 | Corey et al. | |
| 7,016,708 B1 | 3/2006 | Chan et al. | |
| 8,857,687 B1 | 10/2014 | An | |
| 8,870,137 B2 | 10/2014 | Jacobson | |
| 9,045,096 B2 | 6/2015 | Procter et al. | |
| 9,573,686 B2 | 2/2017 | Barth | |
| 9,581,291 B2 | 2/2017 | Trotsky | |
| 9,695,977 B2 | 7/2017 | Blalock et al. | |
| 10,207,653 B1 | 2/2019 | Terzich | |
| 2011/0248060 A1 | 10/2011 | Luk et al. | |
| 2015/0123433 A1 | 5/2015 | Lamb, Jr. et al. | |
| 2015/0329209 A1 | 11/2015 | Muirhead | |
| 2015/0331448 A1 | 11/2015 | Truong et al. | |
| 2015/0343957 A1 | 12/2015 | Narayanan et al. | |
| 2016/0167587 A1 | 6/2016 | Dry et al. | |
| 2016/0176356 A1 | 6/2016 | Krikorian et al. | |
| 2016/0281919 A1 * | 9/2016 | Kofler ................. | F16M 13/022 |
| 2016/0304033 A1 | 10/2016 | Wang | |
| 2017/0088265 A1 | 3/2017 | Brick | |
| 2017/0237843 A1 | 8/2017 | Ackeret et al. | |
| 2017/0313260 A1 | 11/2017 | Minn et al. | |
| 2018/0111690 A1 | 4/2018 | Zheng et al. | |
| 2019/0037722 A1 | 1/2019 | Maisenbacher et al. | |

* cited by examiner

*Primary Examiner* — Hsinchun Liao
(74) *Attorney, Agent, or Firm* — Dunlap Bennett & Ludwig, PLLC; Brendan E. Squire

(57) ABSTRACT

A smart device support is disclosed to mount a mobile electronic device to a variety of support surfaces, such as a seatback of a common carrier transport, a motor vehicle, and the like. The smart device support includes a frame. A lip protrudes from a front surface of the frame. The lip dimensioned to engage with a top edge of the mobile electronic device. An elastic band with opposed terminal ends of the elastic band extending from the front surface the frame. The elastic band is configured to retain a corner of the mobile electronic device and urge the top edge of the mobile electronic device in engagement with the lip. The smart device support may be mounted to the support surface via a suction cup or a tongue extending from a back surface of the frame.

12 Claims, 4 Drawing Sheets

SMART DEVICE SUPPORT

BACKGROUND OF THE INVENTION

The present invention relates to a smart device support and, more particularly, to a pocket-sized smart device support that secures a tablet or phone to a back side of a passenger chair.

Once a plane reaches 10,000+ feet customers can stream live television, movies, and video games on demand through personal media devices. Depending on the airline, this service can be free of charge providing the customer downloads the airlines app prior to take off or there may be a charge from a third-party WI-FI provider. While using your own personal media device to view entertainment may seem convenient it can also present several problems. To enjoy a TV show or movie you have to hold your media device in your hand which could become uncomfortable. Alternatively, the tray table may be lowered to support, and the media device may be propped up using a protective case. When the airline serves food or you want to multitask and do some computer work while listening or watching a video in the background, there is no room to accommodate both.

Another problem of having to hold a media device or propping the device on the table to view entertainment during long flights is tilting your head downward in an awkward position to view the media device. Doing so for sustained periods of time can cause repetitive strain injury (RSI) which is an injury to the musculoskeletal and nervous system caused by repetitive tasks or sustained awkward positions.

As can be seen, there is a need for a pocket-sized smart device support that secures a tablet or phone to a back side of a passenger chair.

SUMMARY OF THE INVENTION

In one aspect of the present invention, a smart device support is disclosed. The smart device support includes a frame comprising a front surface and a rear surface, a top end, and a bottom end. A lip protrudes from the front surface. The lip is dimensioned to engage with an edge of a mobile electronic device. The lip protrudes from one of the top end or the bottom end. An elastic band extends from the front surface at an opposite end of the frame from the lip. The elastic band has a loop defined in opposed terminal ends of the elastic band. The loop is dimensioned to retain a corner of the mobile electronic device and urge the edge of the mobile electronic device in engagement with the lip.

In some embodiments, the smart device support ma also include a slot defined at a top end of the frame. The slot is configured to retain a back end of a suction cup. A suction cup may then be received within the slot.

In some embodiments, a tongue slot is defined in a top end of the frame. The tongue slot is configured to retain a flexible tongue received through the front surface of the frame. The flexible tongue may then be received through the tongue slot. A plurality of protrusions may be defined along a surface of the flexible tongue. A tab may also be defined at an end of the flexible tongue to retain the flexible tongue in the tongue slot.

In some embodiments, a plurality of openings are defined through the front surface of the frame and disposed in a spaced apart relation. The elastic band may then be threaded through the plurality of openings.

In another aspect of the invention, a smart device support includes a frame having a front surface and a rear surface, a top end, and a bottom end. A lip protrudes from the front surface. The lip is dimensioned to engage with a top edge of a mobile electronic device with the lip protruding from the top of the frame. A plurality of openings are disposed in a spaced apart relation at the bottom end of the frame. An elastic band is threaded through the plurality of openings with opposed terminal ends of the elastic band extending from the front surface the frame. The elastic band is configured to retain a corner of the mobile electronic device and urge the top edge of the mobile electronic device in engagement with the lip.

In some embodiments, a loop is defined in the opposed terminal ends of the elastic band. The loop is dimensioned to engage with a corner of the mobile electronic device.

In some embodiments, a flexible tongue extends from a back surface of the frame.

In other embodiments, a suction cup is coupled to a back surface of the frame.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a smart device support comprising: a frame comprising a front surface and a rear surface; a tongue protruding from the rear surface; a lip extending from the front surface; and an elastic band extending from the front surface.

The present invention includes a pocket sizes attachment to support smart devices using table trays, existing screens, or menu pockets while seated in airplanes, trains, and buses. The present invention solves the problem of a supporting various sized mobile electronic device by simply strapping the tablet or phone device into the clip and an elastic silicon band then hanging the seated device from the forward chair or menu pocket. The present invention is pocket size, simple in design and very effective in supporting most all mobile electronic devices for viewing while traveling.

Figure 1:
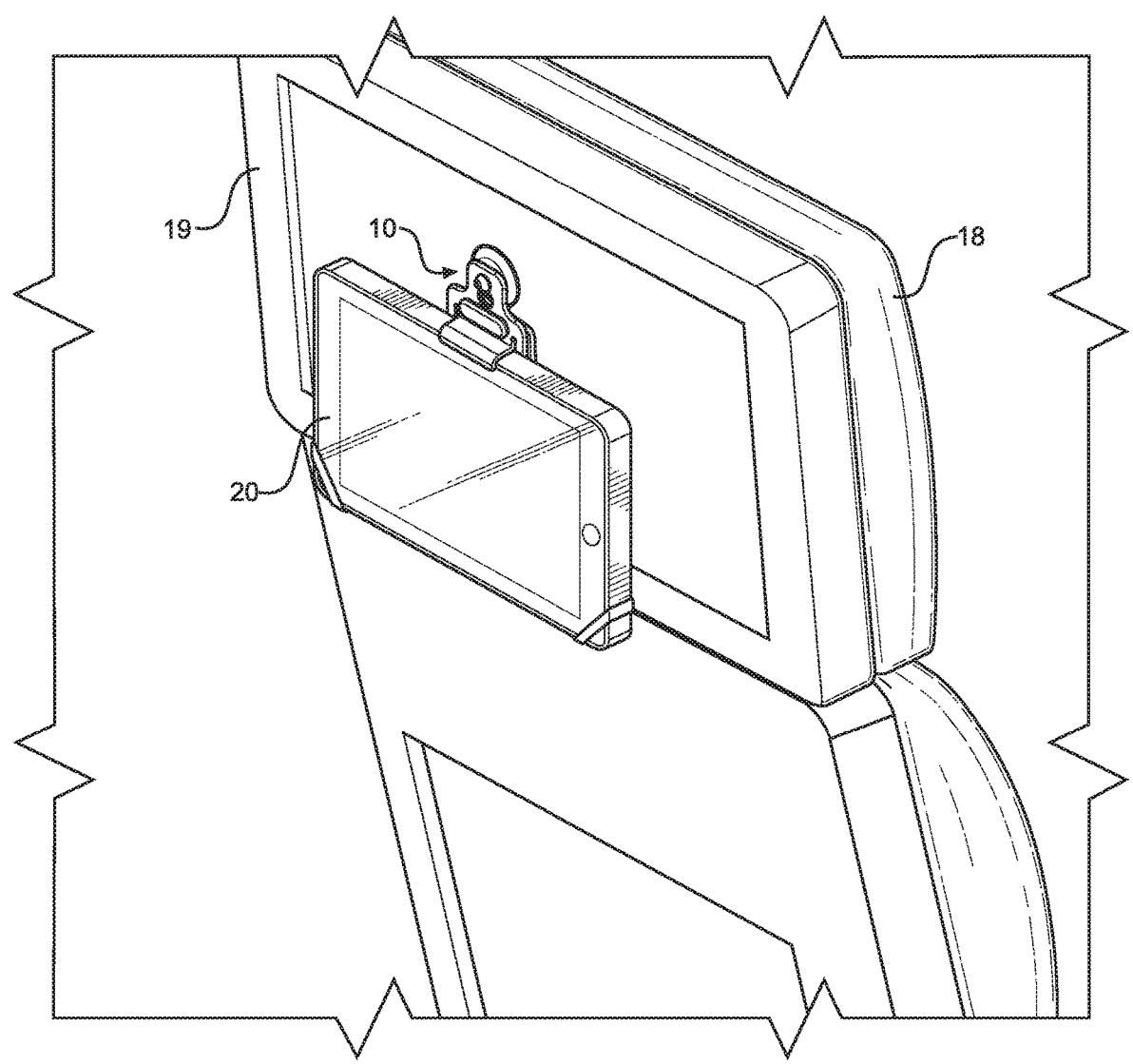
FIG. 1 is a perspective view of an embodiment of a smart device support shown in use.
Figure 2:
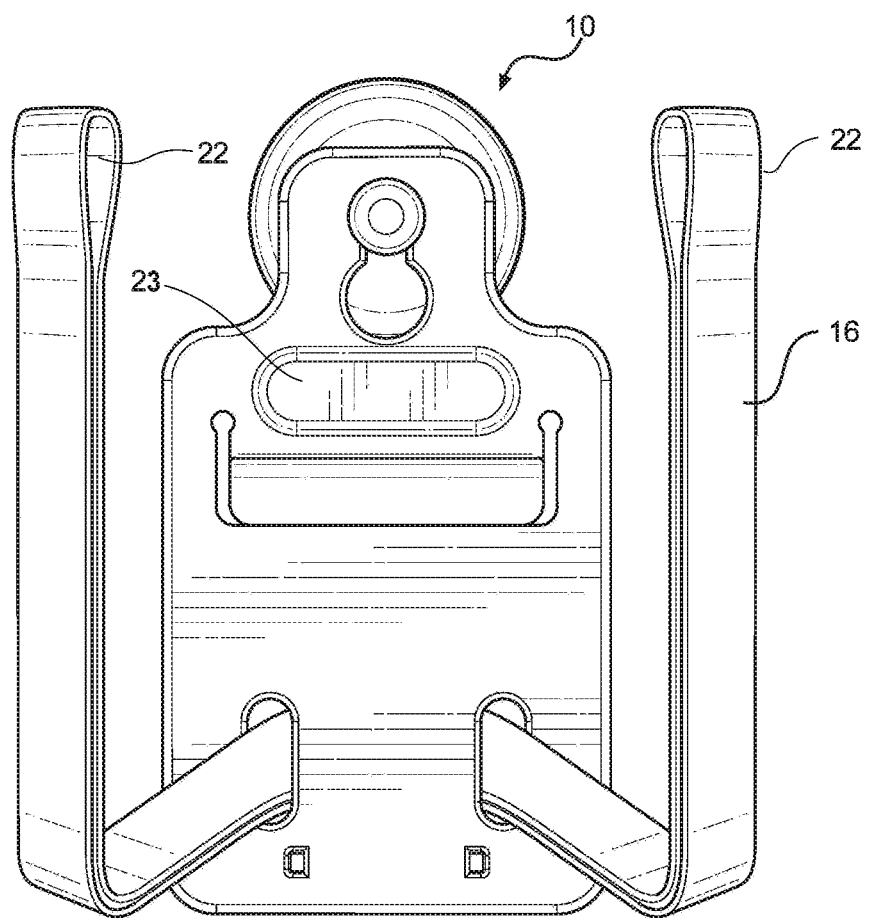
FIG. 2 is a front view of an embodiment of the smart device support.
Figure 3:
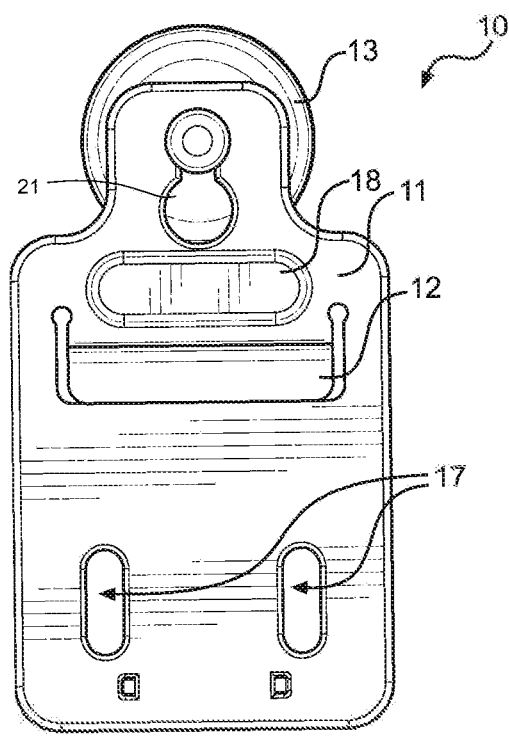
FIG. 3 is a front view of an embodiment of the smart device support.
Figure 4:
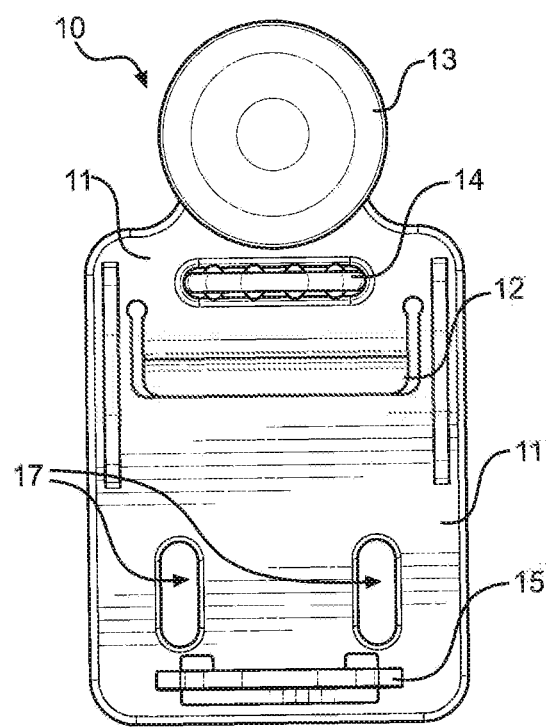
FIG. 4 is a back view of an embodiment of the smart device support.
Figure 5:
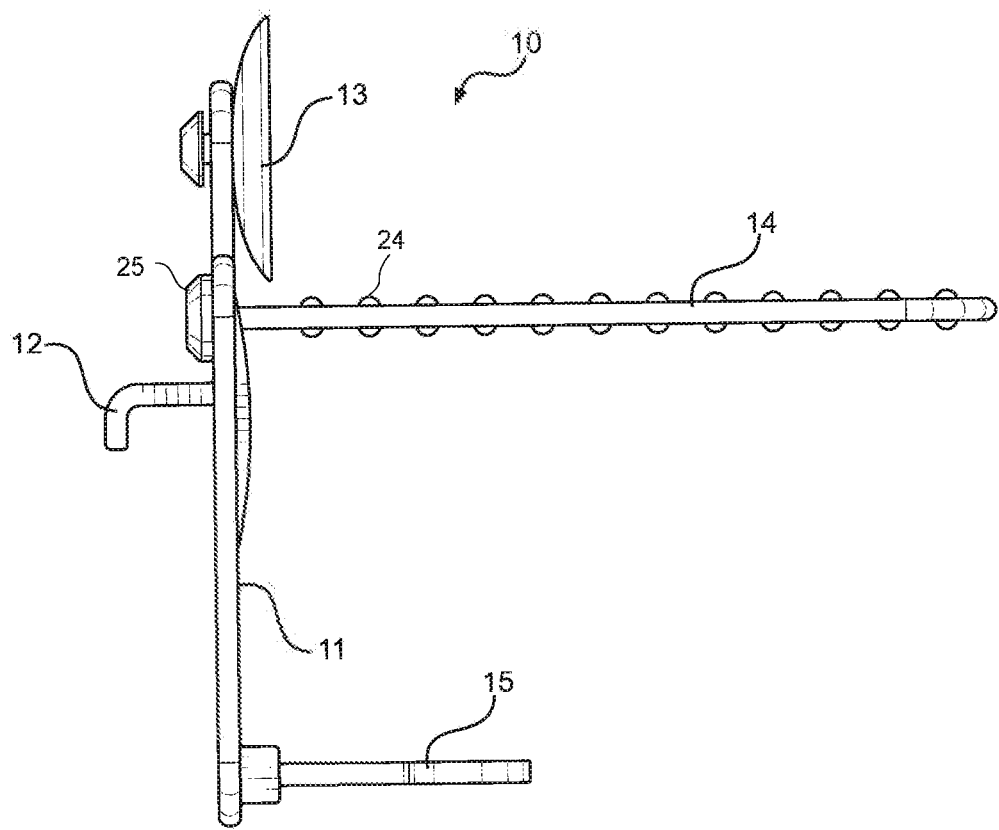
FIG. 5 is a side view of an embodiment of the smart device support.
Figure 6:
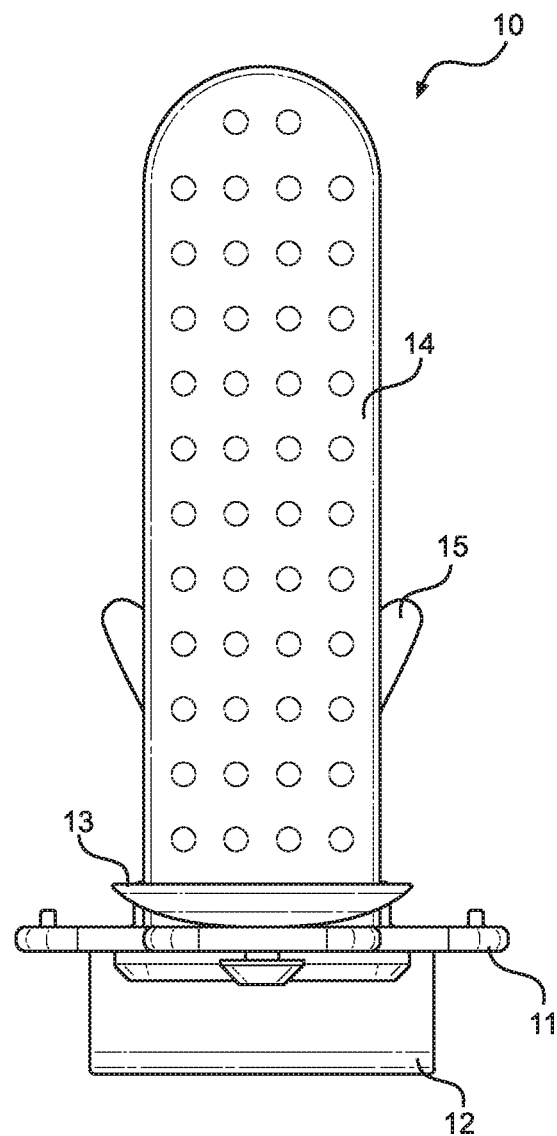
FIG. 6 is a side view of an embodiment of the smart device support.
Figure 7:
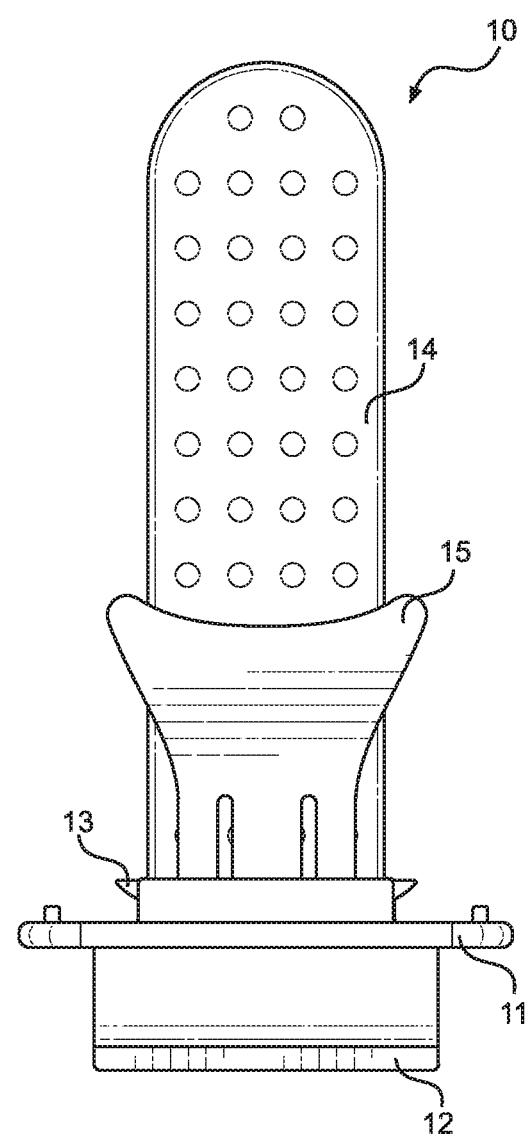
FIG. 7 is a bottom view of an embodiment of the smart device support.

Referring now to FIGS. 1 through 7, a smart device support 10 according to aspects the present invention may include the following elements:

10: is the Phone Holder;
11: is the molded frame;
12: is the lip;
13: is a suction cup;
14: is the flexible tongue;
15: is a tray table;
16: is the elastic band;
17: is the openings to insert the elastic band;
18: is the seat;
19: is a portable tv screen;
20: is the mobile device; and
21: is a slotted opening.

The frame 11 is the main anchoring frame for the smart device support 10. The elastic band 16 is woven through a plurality of openings 17 defined through the frame 11. The elastic band 16 may be constructed from a material selected from the group consisting of rubber, elastic fabric, or silicone. Terminal ends of the elastic band 16 include a loop 22 configured to engage with a corner of the mobile electronic device 20. The elastic band 16 may be a continuous loop band. In the embodiment shown, the plurality of openings 17 are disposed at a lower portion of the frame 11 in a spaced apart manner.

The suction cup 13 is detachably attached at a slot 21 defined through a top end of the frame 11 as an optional method of attachment. The flexible tongue 14 is placed through a tongue slot 23 defined through the frame 11 but beneath the slot 21 for the suction cup 13 as an alternative optional attachment when the smart device support 10 is in use.

The frame 11 may be formed in an injection molding process and has a protruding lip 12 projecting from a front surface of the frame 11. In the embodiment shown in the drawings, the protruding lip is positioned proximal to the top of the frame 11, or in a position opposite from that of the plurality of openings 17. The elastic band 16 is woven through the plurality of openings 17 in the frame 11 such that terminal ends of the elastic band 16 extend through a front face of the frame 11.

A top end of a mobile electronic device 20, such as a cell phone, a tablet, or other video device having a viewing screen, is placed under the lip 12 of the frame 11. The terminal ends of the elastic band 16 have a loop are stretched around a left and a right corner of the mobile electronic device 20 viewing screen, such that the elastic band 16 produces an directional tension to urge the mobile electronic device 20 against the protruding lip 12 and the elastic band 16 resiliently retains the left and the right corners of the mobile electronic device 20 for securement of the mobile electronic device 20 to the frame 11.

To mount the smart device support 10, the flexible tongue 14, when utilized, can be trapped in an extendable tray table 15, a head rest, or a facing seat pocket to support mounted the mobile electronic device 20 in a hands-free manner for viewing. The flexible tongue 14 may have a plurality of protrusions 24 to provide a frictional interface with the selected mounting location and a tab 25 to retain the flexible tongue 14 within the tongue slot 18.

Alternatively, the suction cup 13 can be used to suction onto a suitable mounting surface, such as an existing seat back video screen 19, a window, or other smooth mounting surface, to mount the smart device support 10 and the mobile electronic device 20 supported thereon.

A method of using the present invention may include the following. Mount the position the mobile electronic device 20 by sliding a top of the mobile electronic device 10 for engagement in the lip 12. The terminal ends of the elastic strap 16 are wrapped about the opposite corners of the mobile electronic device 20 and the loops 22 are secured to the opposite corners, to secure the lower two corners of their screen. Then trap the flexible tongue 14 into the facing tray table or seat pocket in a train, airplane or bus then proceed to watch their desired show hands free. can be used to hold noted pads of paper for referencing notes while working. Alternatively, the present invention can hold a mirror for the purpose of makeup application before completing a flight or train ride, bus ride.

It should be understood, of course, that the foregoing relates to exemplary embodiments of the invention and that modifications may be made without departing from the spirit and scope of the invention as set forth in the following claims.

What is claimed is:

1. A smart device support comprising:
   a frame comprising a front surface and a rear surface, a top end, and a bottom end;
   a lip protruding from the front surface proximal to the top end, the lip having a downwardly turned edge dimensioned to engage with a side edge of a mobile electronic device; and
   an elastic band extending from an aperture defined in the front surface at an opposite end of the frame from the lip, the elastic band having a loop defined in opposed terminal ends of the elastic band, the loop dimensioned to retain a corner of the mobile electronic device and urge the side edge of the mobile electronic device in engagement with the lip.

2. The smart device support of claim 1, further comprising:
   a slot defined at the top end of the frame, the slot configured to retain a back end of a suction cup.

3. The smart device support of claim 2, further comprising:
   the suction cup received within the slot.

4. The smart device support of claim 1, further comprising:
   a tongue slot defined in the top end of the frame, the tongue slot configured to retain a flexible tongue received through the front surface of the frame.

5. The smart device support of claim 4, further comprising:
   the flexible tongue received through the tongue slot.

6. The smart device support of claim 5, further comprising:
   a plurality of protrusions defined along a surface of the flexible tongue.

7. The smart device support of claim 5, further comprising:
   a tab defined at an end of the flexible tongue to retain the flexible tongue in the tongue slot.

8. The smart device support of claim 1, further comprising:
   a plurality of openings defined through the front surface of the frame and disposed in a spaced apart relation, wherein the elastic band is threaded through the plurality of openings.

9. A smart device support, comprising:
   a frame comprising a front surface and a rear surface, a top end, and a bottom end;
   a lip protruding from the front surface, the lip dimensioned to engage with a top edge of a mobile electronic device, the lip protruding from the top end of the frame;
   a plurality of openings disposed in a spaced apart relation at the bottom end of the frame; and an elastic band threaded through the plurality of openings with a opposed terminal ends of the elastic band extending from the front surface the frame, the elastic band configured to retain a corner of the mobile electronic device and urge the top edge of the mobile electronic device in engagement with the lip.

10. The smart device support of claim 9, further comprising:

a loop defined in the opposed terminal ends of the elastic band, the loop dimensioned to engage with the corner of the mobile electronic device.

11. The smart device support of claim 9, further comprising:

a flexible tongue extending from a back surface of the frame.

12. The smart device support of claim 9, further comprising:

a suction cup coupled to the rear surface of the frame.

\* \* \* \* \*